Figure 1:
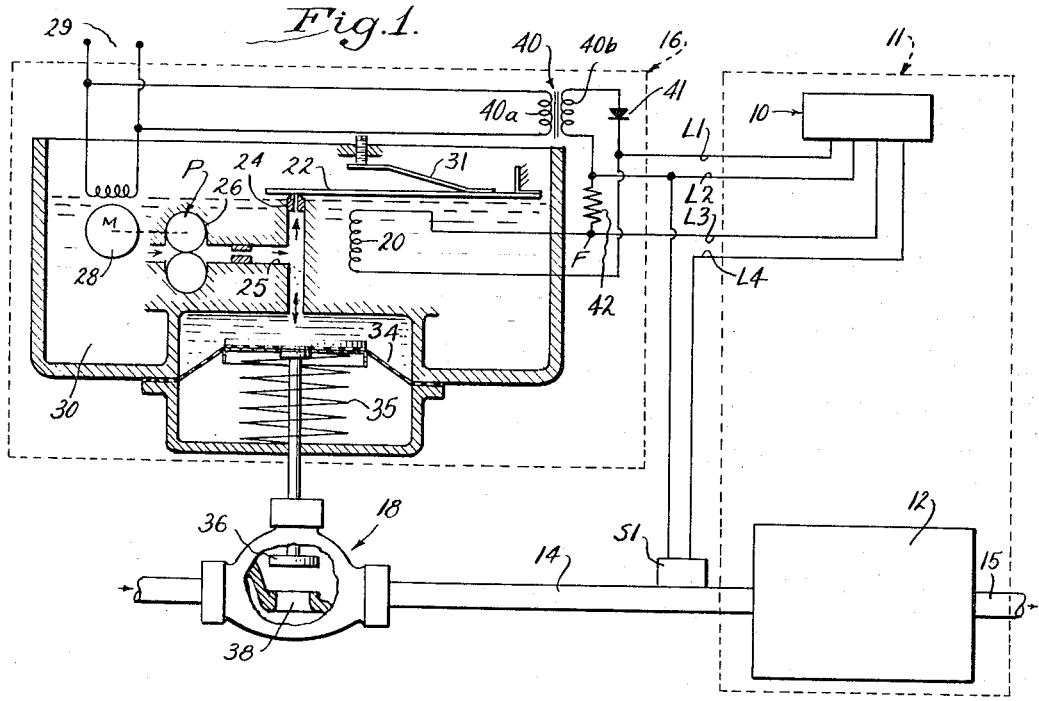

Feb. 21, 1967 P. H. BRACE 3,305,176
THERMOSTATIC UNIT
Filed Aug. 13, 1964 2 Sheets-Sheet 1

INVENTOR.
Paul H. Brace
BY
Wolfe Hubbard Voit & Osann
ATTORNEYS

Feb. 21, 1967   P. H. BRACE   3,305,176
THERMOSTATIC UNIT
Filed Aug. 13, 1964   2 Sheets-Sheet 2

INVENTOR.
Paul H. Brace
BY
Wolfe Hubbard Voit & Osann
ATTORNEYS

United States Patent Office 3,305,176
Patented Feb. 21, 1967

3,305,176
THERMOSTATIC UNIT
Paul H. Brace, Rockford, Ill., assignor to Barber-Colman Company, Rockford, Ill., a corporation of Illinois
Filed Aug. 13, 1964, Ser. No. 389,388
14 Claims. (Cl. 236—74)

The present invention relates in general to temperature control systems, and in particular to thermostatic units for sensing an existing temperature and proportionally controlling a power operator which acts to restore the temperature to a desired value when there are departures therefrom. While not so limited in its applications, the invention finds one especially advantageous use in the proportional control of temperatures within separate rooms or areas of a multi-area building having a central source of heating or cooling heat exchange fluid.

The general aim of the invention is to provide a completely self-contained thermostatic unit for a proportional temperature control system, the unit being as compact as a conventional wall-mounted bimetal thermostatic switch, and yet capable of directly controlling a remotely located power operator.

More particularly, it is an object of the invention to provide a compact, standard-size thermostatic unit which not only senses the error between an actual temperature and an adjustable set point, but which also supplies an amplified output signal proportional to such error and of sufficient strength to control a final power operator.

Another object of the invention is to provide such a compact thermostatic unit susceptible of wall-mounting, and including therein a plurality of adjustable means for changing the set point, calibration, zero point, and throttling range of the control system, thereby making it possible to perform any necessary adjustments on the system right at the thermostat itself, without requiring access to a remotely located and difficult-to-reach amplifier or power operator. Repeated readjustment of the calibration, zero point and throttling range factors is often necessary when a given system is initially installed or subsequently altered in any way. The present invention eliminates the tedious and time consuming inconveniences heretofore associated with such adjustments and makes it unnecessary for the installing technician to crawl repeatedly into attics, ducts, or interwall spaces to effect repeated adjustments.

It is also an object of the invention to provide a thermostatic unit which, in cooperation with an associated power operator eliminates adverse effects on the temperature controlling action which might otherwise be caused by spurious variations in the supply voltage for the system, and yet which accomplishes this without requiring special devices to provide a precisely regulated supply voltage.

Still another object of the invention is to provide a proportional thermostatic unit which is conditioned alternatively for "winter" or "summer" operation, i.e., for controlling the temperature of a space which is being either heated or cooled, and with the change being effected simply in response to actuation of but a single switch element.

A related object is to provide a proportional thermostatic unit in which the sense of a proportional error signal may be made either the same as or opposite to the sense of the temperature error in response to opening or closing of a single pole, single throw thermostatic switch, thereby to effect automatic change-over from heating control to cooling control conditions.

Figure 2:
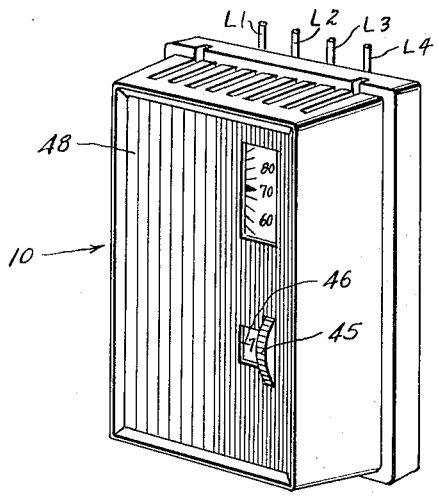
Figure 3:
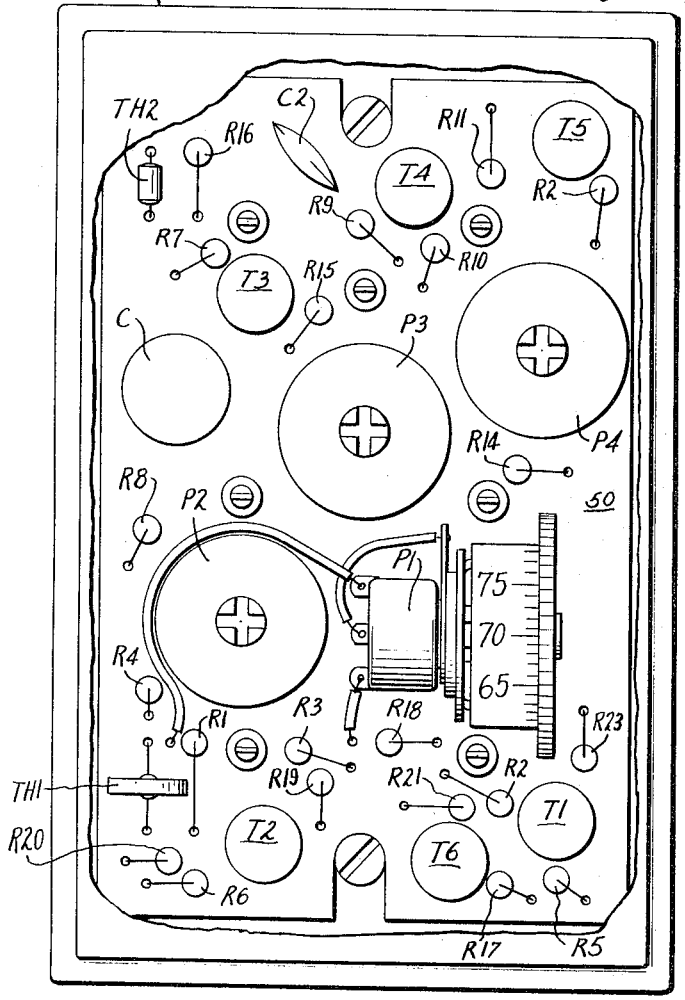

Other objects and advantages will become apparent as the following description proceeds, taken in conjunction with the accompanying drawings, in which FIGURE 1 is a diagrammatic illustration of an exemplary temperature control system which includes a thermostatic unit embodying the features of the invention and a power operator here shown to illustrate an exemplary environment in which the invention is employed;

FIG. 2 is a perspective view of the thermostatic unit;
FIG. 3. is an enlarged pictorial elevation of the thermostatic unit with the housing removed to expose the several adjustment devices included therein; and
FIG. 4 is a schematic circuit diagram for the thermostatic unit, and showing also certain electrically associated components of the power controller.

While the invention has been shown and will be described in some detail with reference to a particular embodiment thereof, there is no intention that it thus be limited to such detail. On the contrary, it is intended here to cover all alternatives, modifications and equivalent falling within the spirit and scope of the invention as defined by the appended claims.

Referring now to FIG. 1, a thermostatic unit 10 is there illustrated as disposed in a room or controlled space 11 for the purpose of sensing and controlling the temperature of the latter. Associated with this controlled space is a heat exchanger 12 which may take the form of a radiator having an inlet 14 and an outlet 15. To heat or cool the controlled space, the flow of heat exchange fluid from any suitable source (e.g., a furnace boiler or cooling compressor) is controlled by a power operator 16 which includes a throttle valve 18. Heat exchange fluid flows from the source through the valve 18, through the heat exchanger 12, and then returns to the source. While the system is here illustrated as involving the flow of a heat exchange liquid such as water, it will be understood that the same general organization may be used in connection with controlling the flow of heated or cooled air, or any other suitable heat exchange medium.

If the temperature sensed by the thermostatic unit 10 does not agree with a desired set point value, the unit creates a control signal which is supplied to the power operator 16 and which causes the latter to further open or close the valve 18, thereby to adjust the rate of flow of the heat exchange fluid, and thus correctively to change the control temperature. The power operator 16 may take any of a variety of specific forms, and it is shown only diagrammatically in FIG. 1 as being of the type more fully illustrated and described in Sweger et al. patent Re. 25,540, reissued March 24, 1964.

In the exemplary arrangement here shown, the thermostatic unit 10 controls the energization of an electrical load device in the form of a solenoid 20 associated with an armature here shown as a pivoted vane or flapper 22 disposed opposite an orifice 24 in the output conduit 25 of a pump 26. The pump is driven continuously by a motor 28 energized from an A.C. voltage source 29, and thus circulates fluid from a sump 30 through the orifice 24 and back to the sump. The fluid pressure in the output conduit 25 thus depends on the position of the flapper 22 relative to the orifice, this pressure being greater as the flapper more closely approaches and tends to close the orifice. The position of the flapper is determined by the magnitude of current passed through the solenoid 20 and the resulting downward force magnetically exerted on the flapper to assist the downward force of a leaf spring 31.

The pressure existing in the conduit 25 is transferred by a piping connection to a chamber bounded by a flexible diaphragm 34 in the body of the operator 16. The diaphragm is urged upwardly by a compression spring 35 and carries a stem having a valve head 36 adapted to close and open relative to a valve seat 38. As the valve moves downwardly or upwardly in response to increases or decreases in the pressure within the diaphragm chamber, the valve closes or opens more to decrease or increase the rate of flow of heat exchange fluid.

In summary, therefore, the degree to which the valve 18 is opened, and the rate at which heat energy is added to or removed from the controlled space 11, is inversely related to the magnitude of current passed through the load solenoid 20. As the solenoid current increases, the pressure in the output conduit 25 increases, the valve 18 closes more, and the rate of heat transfer is reduced. It may be noted briefly at this point that the pump output pressure and the valve position may be subject to undesired changes due to fluctuations of the voltage from source 29 and corresponding changes in the speed of the motor 28. While this effect is not of great magnitude, it is cancelled in a manner to be described below.

As shown in FIG. 1, the thermostatic unit 10 is connected to the power operator 16 by only three wires L1, L2, L3 which may be as long as might be desired. (A fourth wire L4 may be employed for a purpose to be described below.) These three wires not only supply the necessary operating voltage to the thermostatic unit, but also constitute the connection to the solenoid 20 by which the unit correctively and proportionally varies the opening of the valve 18. Thus, the operator 16 may be remotely located in an attic, basement, false ceiling or wall space with respect to the thermostatic unit 10 mounted on the wall of the room whose temperature is to be controlled. As shall be noted below, it is unnecessary for a technician to reach the remotely located, inaccessible operator 16 in order to make various necessary adjustments in the operation of the composite system.

In the present instance, the operator includes a transformer 40 having a primary winding 40a connected to the same A.C. source 29 which energizes the motor 28, and having a secondary winding 40b in series with a rectifying diode 41 across voltage supply lines L1 and L2. These first and second supply lines thus receive between them a D.C. supply voltage, and are adapted for connection to first and second conductors in the thermostatic unit 10. A current limiting resistor 42 is disposed in the operator, and connected in series with the solenoid 20 across the voltage supply lines L1 and L2, the line L3 connecting to the junction F between the resistor 42 and solenoid 20.

These same electrical components are shown again in FIG. 4 to facilitate a description of the operation of the entire circuit which they form with those electrical components disposed within the thermostatic unit 10. It will be seen from FIG. 4 that the lines L1, L2 connect respectively to the opposite ends of the series combination formed by the transformer secondary winding 40b and the rectifier 41, there being a smoothing or filtering capacitor C connected between the lines L1 and L2 so that a relatively low D.C. supply voltage of fixed polarity making the conductor L1 positive with respect the conductor L2 exists within the thermostatic unit for operating the various circuits to be described.

In accordance with the present invention, means are provided in the thermostatic unit 10 to produce an error signal which varies in magnitude and polarity acording to the magnitude and sense of the error between the sensed temperature of the controlled space in which the thermostatic unit is disposed and an adjustable set point temperature. Such error signalling means receives its operating input voltage from the conductors L1, L2 and the polarity relationship between the error voltage and the sense of the temperature error is reversible by changing the sense of its connection to the conductors L1, L2. For this purpose, a resistive bridge B is formed with input terminals B1, B2 and output terminals B3, B4. The bridge includes as one leg thereof a temperature sensing element here shown as a thermistor TH1 having a large negative temperature coefficient of resistance (and which is paralleled by a fixed resistor R1 for improving the linearity of its resistance versus temperature characteristic). The remaining three legs of the bridge B are formed principally by resistors R2, R3, and R4. However, as an adjustable means for determining the desired "set point" temperature, the bridge includes a potentiometer P1 interposed between thermistor TH1 and resistor R2, the adjustable wipe P1a thus connecting to the output terminal B3. Moreover, an adjustable device for calibrating the bridge B is constituted by a potentiometer P2 interposed between the resistors R3 and R4, and with its movable wiper P2a forming the output terminal B4.

The bridge receives on its input terminals B1, B2 an operating voltage taken from the voltage appearing between the conductors L1 and L2. It may be observed that the first input terminal B1 is connected through a solid state switching device, here shown as a PNP transistor T1, in series with a resistor R5 to the first conductor L1; while the second input terminal B2 is connected through a solid state switching device, e.g., an NPN transistor T2, and a resistor R6 to the second conductor L2. Assuming for the moment that the apparatus is conditioned for heating control and these two transistors T1, T2 are made fully conductive (under conditions and by virtue of biasing means to be hereinafter explained), the terminal B1 is made positive with respect to the bridge terminal B2, and an output or error voltage thus will appear between the terminals B3, B4 when the bridge is unbalanced.

Let it be assumed that the bridge B is balanced and that the error voltage Ee between the terminals B3, B4 is zero. If now the temperature of the controlled space falls (the desired temperature becomes greater than the actual temprature) and the resistance of the thermistor TH1 rises, the terminal B3 will become positive with respect to the terminal B4. On the other hand, if the sensed temperature rises (the desired temperature is less than the actual temperature) and the thermistor resistance falls, then the output terminal B3 will become negative with respect to terminal B4.

The set point or desired temperature at which bridge balance occurs is determined by the adjustment of the potentiometer P1, movement of the wiper P1a in effect increasing or decreasing the resistance in the upper left leg of the bridge and correspondingly decreasing or increasing the resistance in the lower left leg of the bridge. The wiper P1a is mechanically connected with a set point dial 45 (FIG. 2) calibrated in temperature values readable opposite an index mark 46 on the unit housing 48 through which the dial projects. If the bridge output or error voltage Ee for any reason is not zero when the actual temperature agrees with the dial setting, the "calibrate" potentiometer P2 may be adjusted to balance the bridge at that point, so that the dial reading becomes accurate.

Assuming the input terminals B1 and B2 to be excited with a D.C. input voltage making the former positive relative to the latter, the bridge output voltage Ee is proportional in magnitude to the temperature error, that is, the difference between the acutal sensed temperature and the desired set point temperature. Moreover, the polarity of the bridge output voltage Ee designates the sense of the temperature error, since the terminal B3 is positive or negative with respect to the terminal B4 when the desired temperature is below or above the actual temperature.

The bridge B with the thermistor TH1 therein cannot, as a practical matter, produce an error voltage Ee at a sufficient power level to actuate a final operator. If relatively great currents are drawn from the bridge, its accuracy will be destroyed. To overcome this difficulty, a very compact transistor amplifier, responsive to the variable error voltage Ee and operative to correspondingly change the current in the load solenoid 20, is disposed within the thermostat housing and supplied with an operating voltage from the lines L1, L2. In the arrangement here illustrated, the error voltage Ee is applied from terminals B3 and B4 between the wiper P3a and the lower end of a potentiometer P3 which is connected between the base and emitter of an amplifying NPN transistor T3. The emitter of this transistor is connected to a point of reference potential at the junction A of voltage dividing resistors R7 and R8 connected in series across the voltage supply conductors L1, L2. The collector of transistor T3 is connected through a load resistor R9 to the positive supply line L1.

The transistor T3 is biased to operate in a conductive region in a manner to be more fully described below. It may be noted at this point, however, that as the error voltage $Ee$ increases from zero in a positive or negative sense, the base-emitter current of the transistor T3 is increased or decreased, and the potential of a point D at the lower end of resistor R9 decreases or increases. This latter point D is connected to the base of a PNP amplifying transistor T4 which has its emitter connected through a load resistor R10 to the positive line L1, and its collector connected through a resistor R11 to the junction F between the solenoid 20 and the associated resistor 42.

As current through the transistor T3 increases or decreases and the potential at point D swings less positive or more positive, the emitter-collector current of transistor T4 increases or decreases, and a point G decreases or increases in potential. The latter point is connected to the base of a transistor T5 which has its emitter-collector junction connected through resistors R12 and R11 between the first conductor L1 and the junction F, and it is thus in parallel with the solenoid 20. Whenever the point G decreases or increases in potential, the transistor T5 becomes more or less conductive, and therefore bypasses more or less current around the solenoid 20. Thus, the transistors T4 and T5, connected in a modified "Darlington" arrangement, form a final output circuit which serves to vary the load current through the solenoid 20 by changing the amount of current bypassed around the latter according to the value of the error signal $Ee$. Because the transistor T4 not only in part varies the bypassed current but also controls the transistor T5 to cause the latter to vary the bypassed current, the total range current variation is greater than would otherwise be possible with a single transistor output circuit having the same current rating as transistors T4 and T5.

In summary, during heating control or "winter operation," when the error voltage $Ee$ produced by the bridge B swings positive or negative from a zero or null value, the transistor T3 is made more or less conductive, the point D decreases or increases in potential to make the transistor T4 increase or decrease in conduction, so that the point G decreases or increases in potential and the transistor T5 increases or decreases its emitter-collector conduction, thereby to decrease or increase the energizing current passed through the load solenoid 20. Such decreasing or increasing of the solenoid current as the temperature falls below or rises above the set point value causes the flapper 22 (FIG. 1) to shift in an opening or closing direction relative to the orifice 24 and thus decrease or increase the pressure in the pump output conduit 25. Accordingly, the valve 18 is opened or closed more to increase or decrease the flow of heat exchange fluid to the heat exchanger 12, thereby causing the temperature in the control space 11 to rise or fall until it is restored to the set point value.

Referring again to FIG. 4, as the current through transistors T4 and T5 increases or decreases, the line L3 and junction F will increase or decrease in potential due to the voltage drop across resistor 42, and the current through the solenoid 20 will decrease or increase. To stabilize the two-stage amplifier formed by the transistors T3, T4, T5, a capacitor C2 is connected between the junction F and the base of transistor T4, thus introducing by negative feedback an integral term into the amplifier transfer function and damping any oscillations or unduly abrupt changes in the current passed by the transistors T4 and T5. Moreover, the variations in potential appearing at the junction F are fed back through a resistor R14 to the potentiometer wiper P3a, and thus to the input of the two-stage amplifier, thereby introducing a positive feedback action which increases the overall gain of the composite amplifier.

In accordance with one aspect of the invention, adjustable means are provided in the thermostatic unit to afford variations in the "zero point" and "throttling range" of the system. Such means take the form of a zero adjust potentiometer P4 having a movable wiper P4a for establishing a zero point, and the potentiometer P3 serves as a means for changing the throttling range.

In the example of FIG. 4, the potentiometer P4 is connected in series with a thermistor TH2 (paralleled by a resistor R16) across the lines L1, L2 to form a voltage divider which produces an adjustable bias voltage at the wiper P4a. The latter wiper is connected through a resistor R15 to the base of transistor T3, the emitter of which is connected to a point A, the latter being maintained at a substantially constant but lower potential than that of the wiper P4a by the voltage dividing resistors R7, R8. Thus, when the error voltage $Ee$ is zero, the base-emitter voltage and the collector current of transistor T3 are determined by the setting of the zero adjust wiper P4a. By adjusting the wiper P4a up or down, the base-emitter bias of transistor T3 is increased or decreased, and thus the steady state current through the load solenoid 20, with no temperature error, is decreased or increased. By making such adjustment, the valve 18 may be set to a position under conditions of temperature equilibrium which permits just enough heat exchange fluid to pass therethrough to balance the heat losses (in the case of heating control) or heat gains (in the case of cooling control) of the controlled space 11. Each controlled space will have its own particular heat loss or gain rate due to different types of building structures and insulation, different numbers of windows, and different areas of outside walls, to name a few of the factors. These different characteristics of different controlled spaces can be compensated for by adjusting the potentiometer P4 so that under conditions of temperature equilibrium the valve 18 is opened just enough to cause the heat exchanger to cancel out these heat losses or gains. Thus, the potentiometer P4 forms an adjustable device for varying the "zero adjust" setting of the system by affording changes in the steady-state bias of the transistor T3.

The thermistor TH2 in series with potentiometer P4 serves to cancel changes in the control current through solenoid 20 which might otherwise occur with changes in the temperature within the localized position of the thermostat housing containing the transistors, resistors, and other heat generating elements. For example, if the temperature in the region of transistors T3, T4, T5 increases or decreases, their respective gains would tend to increase or decrease, thereby decreasing or increasing the current through solenoid 20 as an effect separate and apart from that produced by the error voltage $Ee$. However, when the temperature of the controlled space increases or decreases, the resistance of the thermistor TH2 decreases or increases, and the potential of the wiper P4a (for a given setting of the latter) decreases or increases. This changes the bias of the base of the transistor T3, makes its collector current decrease or increase, and thus cancels the tendency for the load current through the solenoid 20 to decrease or increase. The temperature sensitivity of the transistorized amplifier is in this way compensated for, and the solenoid load current made to vary from an equilibruim value substantially solely in response to the error voltage $Ee$.

As noted above, the setting of the zero adjust potentiometer P4 determines the value of equilibrium current passed through the solenoid 20 when the temperature error is zero, and as the error voltage $Ee$ becomes positive or negative, the solenoid current is decreased below or increased above that equilibrium value. For purposes of explaining more clearly how this occurs, it may be assumed that the wiper P4a (for given setting thereof) and the point A are at fixed potentials, with the former being more positive than the latter. This potential difference appears across the resistor R15 and the potentiometer P3 in series; and it also appears across the series combination of the resistor R15 and the base-emitter junction of transistor T3. As the error voltage Ee departs from a zero value and becomes positive or negative, the current flow through the potentiometer P3 from the wiper P4a to the junction A must decrease or increase so that the potentiometer P3 appears, in effect, as a resistor which increases or decreases in value as the error voltage Ee becomes more positive or negative. When the current flow through potentiometer P3 decreases or increases in response to changes in the error voltage, the voltage drop across the resistor R15 decreases or increases, and the base of transistor T3 becomes more positive or less positive, respectively. Thus, when the error voltage Ee becomes more positive or more negative, the base-emitter current of the transistor T3 increases or decreases and that transistor becomes more or less conductive.

The "throttling range" of the temperature control system is the change in the error voltage Ee, or the degrees of change in temperature, required to swing the valve 18 from one limit position to the other, i.e., from its fully closed to its fully open position. If the throttling range is, for example, 4°, the valve 18 will be fully closed or fully opened when the temperature errorr is respectively plus or minus 2°. When the present system is installed, the throttling range must be adjusted according to the particular power operator employed, the characteristics of the controlled space 11 and the heat exchanger 12. If the throttling range is too narrow, the valve 18 may continuously oscillate between open and closed positions, resulting in undue wear. On the other hand, if the throttling range is too wide, the valve will move so slowly that the temperature corrective action will be unduly slow and sluggish.

Simply by changing the setting of potentiometer P3, the throttling range may be varied and set to a desired value. If the wiper P3a is set to a position closer to or farther from the base of the transistor T3, the error voltage Ee appears across a greater or lesser portion of the entire potentiometer P3. Thus, the error voltage must change by a lesser or greater amount to effect a given change in the base-emitter bias of the transistor T3. In other words, the gain of the amplifier which inversely relates the error voltage Ee to the resulting change of the load current through the solenoid 20 from an equilibrium value is increased or decreased, and the throttling range is decreased or increased, respectively. Thus, the potentiometer P3 serves as an adjustable device within the thermostatic unit 10 for varying the amplifier gain and the throttling range of the system.

In accordance with another feature of the invention, the self-contained thermostatic unit 10 includes means for selectively reversing the relationship between the sense of the temperature error and the polarity of the error signal or voltage Ee, thereby to condition the present system for heating or cooling control, i.e., "winter" or "summer" operation. It is often necessary that the system be switched frequently between these two modes of operation as outside temperatures fluctuate over relatively wide ranges, especially in the spring and fall seasons. Heretofore such mode switching has been accomplished by a multipole switch, for example, a double pole, double throw switch. This type of switch is not only larger in size than a single pole switch, but it is also very expensive and difficult to manufacture for reliable operation in a thermostatic or bimetal form so as to be usable for automatic change-over in response to the sensed temperature of the heat exchange fluid.

In the present device, heating or cooling modes of operation are selected in response to operation of a single switch element, here shown as a single pole, single throw switch S1, and preferably a conventional bimetal temperature responsive switch mounted on a pipe or duct which carries the heat exchange fluid, as shown in FIG. 1. The switch S1 is connected between the line L2 and a fourth wire L4 which leads to the thermostatic unit 10. It is open when the heat exchange fluid is warm, indicating that a heating mode of control is to obtain, and it is closed automatically when the heat exchange fluid is cold, indicating that a cooling mode of operation is to be obtained.

In the heating control mode, as previously described, the error voltage Ee becomes positive or negative when the sensed temperature is below or above the set point, and the valve 18 is thus further opened or closed to correctively increase or decrease the actual temperature by producing a greater or lesser rate of flow of heated fluid to the heat exchanger 12. However, in the cooling mode of control, it is necessary to further close or open the valve 18 when the actual temperature is below or above the set point, and thus it is necessary to make the error voltage Ee become negative or positive when the actual sensed temperature is respectively below or above the set point.

To effect these heating or cooling modes in response to the switch S1 being respectively open or closed, the transistors T1 and T2 are respectively connected between (a) the first bridge input terminal B1 and the first voltage supply conductor L1, and (b) the second input terminal B2 and the second conductor L2. When the switch S1 is open, these two transistors are made fully conductive, so that the input circuit for the bridge B takes the path indicated by dashed lines in FIG. 4.

To so bias the transistors T1 and T2 for conduction, a voltage divider comprising four resistors R17 through R20 is connected between the voltage supply lines L1, L2. The base of the transistor T2 is connected to a junction H at the upper end of the resistor R20, so that the base-emitter bias is positive and the transistor T2 is turned fully on. Moreover, the collector of the transistor T2, and thus the terminal B2, will be at a relatively low potential when the transistor T2 is fully on, and this point is connected via a conductor 47 and resistor R21, R23 to the line L1. Thus, the junction of the latter resistor, and base of transistor T1 connected thereto, is normally at a relatively low potential and the transistor T1 is turned fully on. Under these conditions, and as previously explained, the error voltage Ee from the bridge B is positive or negative when the sensed temperature is below or above the set point, and the apparatus is thus conditioned for operation in a heating control mode.

To afford switching to a cooling control mode, a normally non-conductive device in the form of the switch S1 is connected in parallel with the resistors R19 and R20; it is also connected between the first input terminal B1 and the second supply conductor L2. When the switch S1 is closed, the first input terminal B1 is therefore connected directly to the second conductor L2. Also, when the switch S1 is closed, it shorts resistors R19 and R20, the junction H is held at the potential of line L2, so that the transistor T2 is turned off, and the terminal B2 is raised in potential, thereby turning off transistor T1. Still further, when the switch S1 is closed, it reduces the potential at a junction K between the resistors R17 and R18, so that a forward bias across the emitter-base junction of a third solid state switch device, i.e., transistor T6 (previously non-conductive) is made positive, and this transistor is turned on. The collector of the transistor T6 is connected to the second input terminal B2 by the conductor 47, and its emitter is returned through the resistor R5 to the first supply conductor L1. Thus, with the transistors T2 and T1 turned off and the transistor T6 turned on, the second input terminal B2 is connected through the latter transistor to the first line L1, while the first input terminal B1 is connected through the switch S1 to the line L2. It will be seen, therefore, that the operating input voltage supplied to the bridge B under these conditions (and over the circuit paths indicated by dotted lines in FIG. 4) makes the input terminal B2 and B1 respectively positive and negative in polarity. As the sensed temperature falls below or rises above the set value, the error voltage Ee, will become proportionally negative or positive, and the valve 18 will be shifted toward a more open or a more closed position, respectively.

It will now be clear that the polarity of the input voltage applied to the bridge B, and the polarity of the error voltage Ee produced by the bridge, will be changed simply in response to the opening or closing of the single throw thermostatic switch S1. The system will be correspondingly conditioned for operation either in the heating or cooling mode. Because the switch S1 may be made responsive to the temperature of the heat exchange fluid flowing through the valve 18 (see FIG. 1), this changing of modes is effected automatically when the source of exchange fluid makes that fluid relatively cold or hot. When a given building containing a number of individual temperature control systems such as that here described is to be switched from winter heating to summer cooling, or vice versa, it is only necessary for the source of heat exchange fluid to be switched from heating or cooling, and the resulting change in the temperature of the heat exchange fluid will cause the switch S1 and the circuit here described to condition the individual thermostatic units for operation in the proper mode.

From the foregoing description, it will be understood that the exemplary system here described includes a circuit connecting the load solenoid 20 and the resistor 42 in series across the D.C. voltage supply lines L1 and L2. Without the control bridge and amplifier of the thermostatic unit 10, the maximum possible current would flow through the solenoid. However, the thermostatic unit functions, by means of the transistor T3 responsive to the error signal Ee, to bypass variable amounts of current around the solenoid 20, and thereby correctively to modulate the solenoid excitation and correctively to adjust the opening of the valve 18. The D.C. supply voltage on lines L1 and L2 is derived through the transformer 40 and the rectifier 41 from the same A.C. source 29 which energizes the pump motor 28. The arrangement thus permits the transformer 40, the rectifier 41, and the resistor 42—the principal components of the circuitry which tend in operation to generate heat—to be located in or near the operator 16, so they neither take up valuable space nor create false elevations of temperature in the thermostatic unit.

Another very important advantage results from this organization, namely, the automatic elimination of undesirable effects of fluctuations in the amplitude of the A.C. source 29. As noted above, fluctuations of the A.C. voltage source tend to change the speed or torque of the pump motor 28, and thus to produce a change in the pump pressure and valve position even though temperature error signal is zero and the flapper 22 remains stationary. If the A.C. supply voltage increases, for example, and the flapper 22 remains in a given position, the valve 18 closes more, and the rate of heating decreases, even though the sensed temperature is at that time precisely in agreement with the set point value. Such errors due to line voltage fluctuations may make the system operation erratic.

It may be noted, moreover, that in the present system, fluctuations in the voltage of the source 29 cause corresponding changes in the magnitude of the D.C. supply voltage between lines L1, L2. For example, an increase in the D.C. supply voltage would normally cause both the collector currents of transistors T4 and T5 and the current through the solenoid 20 to increase correspondingly, with the result that the flapper 22 would tend to move closer to the orifice 24 and thus cause the valve 18 to close still further, even though the temperature error is zero. Thus, the voltage sensitivity of the pump motor 28 and the circuit for controlling the excitation of the solenoid 20 both would normally tend to introduce cumulative errors when the A.C. supply voltage fluctuates.

This difficulty is here avoided, and without the necessity of utilizing a precision voltage regulator, by virtue of the fact that an increase in the supply voltage across the conductors L1, L2 produces an increase in the absolute value of the forward bias across the emitter-base junction of the transistor T3. That is, when the A.C. voltage of source 29 increases, the potential at the wiper P4a increases, and the collector current of the transistor T3 not only increases due to a rise in the collector-emitter voltage supply, but such increase is augmented by the amplified effect of the increase in the base-emitter bias. In consequence, the input potential between the emitter and the base of the transistor T4 increases more than simply in proportion to the increase in the supply voltage, and this effect is further amplified and repeated at the base of transistor T5. Thus, while an increase in supply voltage tends to cause an increase in the current passed through the load solenoid 20, it causes a much larger, amplified increase in the by-pass current conducted by the transistors T4 and T5. In net effect, the actual current through the solenoid 20 decreases in response to an increase in the supply voltage. Therefore, the flapper 22 moves upwardly (FIG. 2) to effect a reduction in the pump pressure which substantially counterbalances and nullifies the increase in the pressure which otherwise would result from the increased amplitude of the A.C. supply voltage and the increased motor speed. The same effects occur, but in the opposite sense, when the A.C. supply voltage decreases in amplitude.

The present system, by this combination of a power operator with a thermostatic unit and amplifier energized by the same voltage source compensates for source voltage variations, and without requiring the use of expensive precision voltage regulating devices.

Resume of operation

Although the organization and operation of the invention will be apparent from the foregoing, it will be helpful to present a brief resume of the operation and advantages here achieved.

It will be recalled that the bridge B includes as a temperature sensing element the thermistor TH1, and thus produces an output error voltage Ee proportional in magnitude and corresponding in polarity to the extent and sense of the temperature error. As the temperature error increases in one sense or the other, the error voltage Ee is amplified by the transistors T3, T4, and T5 so that conduction of the latter varies the current by-passed around the solenoid 20, thereby varying the current passed through the solenoid, and thus changing the position of the flapper 22 (FIG. 1) to correctively readjust the valve 18.

The thermostatic unit 10 is characterized by its extremely small size, permitting it to be mounted on the wall of a room or office and yet to present the appearance of a standard on-off type bimetal thermostat. It requires only three wires L1, L2, L3 to connect it to the remotely located power operator 16, and it not only receives its operating voltage over these wires, but uses them to control the operator. A fourth wire L4 is required if the mode changing feature described above is employed.

As shown in FIG. 3, the electrical components of the unit 10 are all small in size and may be mounted on a printed circuit board 50 which is exposed when the cover 48 is removed. While the set point temperature may be adjusted by positioning the dial 45 with the cover in place, all necessary adjustments for optimum operation of the control system can be made right at the thermostatic unit simply by removing the cover. This exposes the calibrating potentiometer P2, the zero adjustment potentiometer P4, and the throttling range potentiometer P3 for appropriate setting by the use of an ordinary hand tool such as a screwdriver. These several adjustable devices may have to be readjusted several times when the system is installed or modified, since each may tend to have some effect on the other. This is very conveniently done, since it is unnecessary for the installing technician repeatedly to crawl into remote regions such as attics or inter-wall spaces, or to remove false ceiling panels, in order to gain access to the adjustable potentiometers which have heretofore been located physically with the remotely disposed power operator. When the thermostatic unit 10 is to be used for either heating or cooling modes of control, selection of one or the other is effected by opening or closing a single switch S1. Because only a single throw switch is required, it may conveniently be constituted as a bimetal temperature-sensitive switch located to sense the temperature of the heat exchange fluid and thus to close automatically when a cooling mode of control is to be obtained. Closure or opening of the switch S1 causes the transistors T1, T2, T6 automatically to reverse the polarity of the voltage applied from the lines L1, L2 to the input terminals B1, B2 of the bridge B, and thereby to reverse the relationship between the sense of the temperature error and the polarity of the bridge output error signal.

Finally, the arrangement here disclosed is immune from adverse effects of source voltage fluctuations, since the amplifier formed by transistors T3, T4, T5 responds to any such fluctuations by changing the current passed through the solenoid 20 in a sense and by an amount which substantially cancels the effect of such fluctuations on the motor 28 and the pump 26, leaving the position of the valve 18 substantially unaffected.

I claim as my invention:

1. In a self-contained and conventionally sized proportional thermostatic unit, the combination comprising a single housing in which there are disposed first and second conductors adapted to receive a D.C. supply voltage therebetween; means for producing a D.C. error voltage which in polarity and magnitude corresponds to the sense and extent of the difference between an actual temperature and a desired temperature; said producing means including a resistance bridge having input terminals connected to said conductors and including a set point potentiometer manually adjustable to represent the desired temperature, a manually set calibrate potentiometer, and a temperature-sensitive resistance which in value represents the actual temperature, a transistor amplifier connected to receive an operating voltage from said conductors and connected to receive said error voltage as an input signal; said amplifier having means including a range adjust potentiometer for affording adjustments in the gain of the amplifier, means including a zero adjust potentiometer for adjusting the output produced by the amplifier when the error voltage is zero, and an output circuit with means for producing D.C. current flow therethrough which varies according to the polarity and magnitude of said error signal; such current being adapted to control an electrical power operator remotely located from the thermostatic unit.

2. In a self-contained and conventionally sized thermostatic unit adapted to be mounted on the wall of a temperature-controlled space and to control the operating current through a load device which is connected to a first voltage supply line and through a resistor to a second voltage supply line in a remotely located power operator, the combination comprising first and second conductors adapted to be connected respectively to the first and second voltage supply lines and a third conductor adapted to be connected to the junction between the load device and resistor, an adjustable set point device for representing a desired temperature, a temperature sensing element and means associating it with said set point device and energized from said first and second conductors for producing an error signal corresponding in polarity and magnitude to the sense and extent of the temperature error, a transistor amplifier supplied with an operating voltage from said first and second conductors and connected to receive said error signal as its input, said amplifier including an output circuit between said first and third conductors together with means for varying the current flow through such output circuit in a sense and by an amount corresponding to the polarity and magnitude of said error signal.

3. In a self-contained and conventionally sized proportional thermostatic unit for directly controlling a remotely located power operator which includes a solenoid connected in series with a resistor across first and second D.C. voltage supply lines, the combination comprising first and second conductors adapted to be connected to the first and second supply lines and a third conductor adapted to be connected to the junction between the solenoid and resistor, a resistance bridge having input terminals connected to said first and second conductors, said bridge having means including a temperature-sensing resistor and an adjustable set point potentiometer for producing a D.C. error voltage corresponding in polarity and magnitude to the sense and extent of the difference between actual and desired temperatures, a transistor amplifier connected to said first and second conductors to receive an operating voltage therefrom and including an output circuit having current flow therethrough which varies according to the polarity and magnitude of said error voltage, said output circuit being connected between said first and third conductors so as to be connectable in parallel with said operator solenoid, and said thermostatic unit further including means associated with said amplifier for adjusting the gain thereof and means for adjusting the output circuit current which flows when the error voltage is zero.

4. In a thermostatic unit for proportional temperature control, the combination comprising first and second conductors adapted to receive a D.C. supply voltage therebetween, a resistance bridge having four legs, one of which is constituted by a temperature-sensitive resistance, said bridge having two input terminals and two output terminals and constituting means for producing from an operating voltage applied to the input terminals an error voltage which in polarity and magnitude corresponds to the sense and extent of a temperature error, first and second transistors respectively connected between (a) said first input terminal and said first conductor and (b) said second input terminal and said second conductor, first and second devices respectively connected between (a) said first input terminal and said second conductor and (b) said second input terminal and said first conductor, selector means for selectively rendering (a) said transistors conductive and said devices non-conductive or (b) said transistors non-conductive and said devices conductive, thereby to selectively reverse the relationship of the error voltage polarity to the sense of the temperature error, a transistor amplifier connected to receive an operating voltage from said conductors and to receive said error signal as an input, said amplifier having an output circuit connectable with a remotely located load device and including means for varying the current through the output circuit according to the polarity and magnitude of said error signal, said amplifier further including an adjustable "zero" device and means responsive to its setting for determining the value of current through the output circuit when said error signal is zero, and said amplifier further including an adjustable "range" device and means responsive to its setting for determining the gain factor relating the magnitude of output current change produced by a given change in said error signal.

5. In a thermostatic unit for proportional temperature control, the combination comprising first and second conductors adapted to receive a D.C. supply voltage thereacross; a resistance bridge including a manually adjustable set point potentiometer, a manually set calibrate potentiometer, and a temperature-sensitive resistance; said bridge having first and second input terminals adapted to receive an operating input voltage from which it produces a D.C. error voltage corresponding in polarity and magnitude to the sense and extent of the difference between the actual temperature sensed by said temperature-sensitive resistance and the desired temperature represented by the setting of said set point potentiometer; first and second normally conductive transistors respectively interposed between said first input terminal and said first conductor and interposed between said second input terminal and said second conductor; a single normally open switch and a third normally non-conductive transistor respectively interposed between said first input terminal and said second conductor and interposed between said second input terminal and said first conductor; means responsive to closure of said switch for rendering said first and second transistors non-conductive and rendering said third transistor conductive, thereby to reverse the polarity of the operating voltage supplied to the input terminals of said bridge; a transistor amplifier connected to receive an operating voltage from said conductors and connected to receive said error voltage as an output; means including a range adjust potentiometer for affording adjustments in the gain of said amplifier; means including a zero adjust potentiometer for adjusting the output produced by the amplifier when the error voltage is zero; said amplifier including an output circuit and means for producing current flow therethrough which varies according to the polarity and magnitude of said error signal, such current being adapted to control an electrical power operator remotely located from the thermostatic unit.

6. In a thermostatic unit for a heating and cooling control system, the combination comprising first and second conductors energized with a D.C. supply voltage of fixed polarity, means responsive to an operating voltage applied to first and second input terminals for producing a D.C. error voltage which varies in polarity, relative to the polarity of the operating voltage, according to the sense of the error between actual and desired temperatures, first and second solid state devices of controllable conductivity respectively connected between (a) the first input terminal and first conductor and (b) the second input terminal and the second conductor, a third solid state device of controllable conductivity connected between said second input terminal and said first conductor, a single-pole single-throw selector switch connected between said first input terminal and said second conductor, means controlled by said switch for rendering said first and second devices conductive and said third device non-conductive when the switch is open, and for rendering first and second devices non-conductive and said third device conductive when the switch is closed.

7. The combination set forth in claim 6, further characterized in that said switch is a temperature-sensitive switch adapted to sense the temperature of a heat exchange fluid and to move between open and closed positions when such fluid passes through a predetermined temperature.

8. In a thermostatic unit for proportional temperature control, the combination comprising first and second conductors adapted to receive a D.C. supply voltage therebetween, a resistance bridge having four legs, one of which is constituted by a temperature-sensitive resistance, said bridge having two input terminals and two output terminals and constituting means for producing from an operating voltage applied to the input terminals an error voltage which in polarity and magnitude corresponds to the sense and extent of a temperature error, first and second transistors respectively connected between (a) said first input terminal and said first conductor and (b) said second input terminal and said second conductor, first and second devices respectively connected between (a) said first input terminal and second conductor and (b) said second input terminal and said first conductor, and selector means for selectively rendering (a) said transistors conductive and said devices non-conductive or (b) said transistors non-conductive and said devices conductive, thereby to selectively reverse the relationship of the error voltage polarity to the sense of the temperature error.

9. In a thermostatic unit for proportional temperature control, the combination comprising an adjustable temperature set point device, a temperature sensing element, first and second conductors adapted to receive a D.C. supply voltage thereacross, error signalling means including said set point device and said sensing element and having first and second input terminals adapted to receive an operating input voltage for producing a D.C. error voltage corresponding in polarity and magnitude to the sense and extent of the difference between the actual temperature and the desired temperature represented by the setting of said set point device, a first normally conductive transistor connected between said first input terminal and said first conductor, a second normally conductive transistor connected between said second input terminal and said second conductor, a single normally open switch connected between the said first input terminal and said second conductor, a third normally non-conductive transistor connected between said second input terminal and said first conductor, and means responsive to closure of said switch for rendering said first and second transistors non-conductive and said third transistor conductive, thereby to reverse the polarity of the operating input voltage to said error signalling means.

10. In a thermostatic unit adapted to produce an error signal proportional to a temperature error for controlling a power operator supplying either heating or cooling fluid to a temperature controlled space, the combination comprising first and second conductors adapted to receive a D.C. supply voltage of a fixed polarity thereacross, a resistance bridge having four legs and including first and second input terminals and first and second output terminals, said bridge having in one leg thereof a temperature-sensitive resistance so that said output terminals receive therebetween an error voltage which in polarity corresponds, relative to the polarity of an operating voltage applied between said input terminals, to the sense of the difference between the actual temperature and a desired set point temperature, a first normally conductive transistor connected from said first input terminal to said first conductor, a second normally conductive transistor connected from said second input terminal to said second conductor, a third transistor connected between said second input terminal and said first conductor, means for normally biasing said third transistor to cut-off, a single pole switch connected between said first input terminal and said second conductor, and means responsive to closure of said switch for biasing said first and second transistors to cut-off and said third transistor to conduction, thereby to reverse the polarity relationship between the sense of the said difference and the polarity of said error voltage.

11. In a temperature control system, the combination comprising a power operator for controlling the flow of a heat exchange fluid to a temperature-controlled space, said operator including means energized from an A.C. voltage source and adjusted in response to a control signal for varying the rate of flow of heat exchange fluid in response to both (a) the amplitude of the source voltage and (b) the magnitude of the control signal, a thermostatic unit disposed in said space and including means for producing an error signal corresponding in polarity and magnitude to the sense and extent of the error between actual and desired temperatures, an amplifier connected to receive said error signal and including means for changing a control signal supplied to said operator in a sense to reduce the error and by an amount proportional to the error, means for deriving from said A.C. voltage source an input bias signal which changes according to fluctuations in the source voltage, and means in said amplifier for changing said control signal in response to changes in said bias signal by amounts and in directions to substantially cancel the effects which fluctuations of the source voltage would otherwise produce in the power operator.

12. In a temperature control system, the combination comprising a valve for controlling the flow of heat exchange fluid to a temperature controlled space, a valve operator including power means energized from an A.C. voltage source and governed according to a control current supplied thereto for opening and closing said valve, the valve position being dependent jointly upon the magnitude of the source voltage and the magnitude of the control current, a thermostatic unit disposed in said space and including means for producing an error signal corresponding in polarity and magnitude to the sense and extent of the error between actual and desired temperatures, an amplifier connected to receive said error signal and having means for varying said control current according to the polarity and magnitude of said error signal, means for deriving from said A.C. voltage source a D.C. bias input to said amplifier which varies with fluctuations in the source voltage, and said amplifier including means which change said control current in response to fluctuations in said source voltage and D.C. bias in a manner to substantially cancel changes in the valve position which would otherwise be created by such fluctuations.

13. In a temperature control system, the combination comprising a valve for controlling the flow of heat exchange fluid to a temperature-controlled space, a pump continuously driven by a motor energized from a voltage source, a solenoid and means responsive to control current therethrough for adjustably venting the pump output to increase the pump output pressure as the control current increases, means for variably opening or closing said valve according to decreases or increases in such pressure, a thermostatic unit disposed in said space and including means excited from said voltage source for producing an error voltage which in polarity and magnitude corresponds to the sense and extent of the error between actual and desired temperatures, a transistor amplifier receiving its operating voltage from said source and connected to receive said error voltage as its input, said amplifier including means for proportionally increasing or decreasing the control current flow through said solenoid as said error voltage becomes more negative or positive, and means for deriving from said voltage source a bias signal applied to the input of said amplifier which increases or decreases when the source voltage increases or decreases, whereby a fluctuation in said supply voltage which increases or decreases the motor speed and pump pressure independently of the error voltage causes a change in said bias signal which decreases or increases the solenoid current, thereby to leave the valve position substantially unchanged.

14. In a system for controlling the temperature within a space by varying the rate at which a heat exchange medium is transferred to influence the space temperature, the combination comprising a self-contained and conventionally-sized thermostatic unit adapted to be located within the space, and a power operator adapted to be located remotely from said thermostatic unit; said operator including means adapted for connection to an alternating voltage source, rectifying means for creating a D.C. source voltage, and means responsive to a controlled variable D.C. current for correspondingly modulating the rate of transfer of a heat exchange medium; said unit including first and second conductors connected to said D.C. source voltage to receive the latter as an operating voltage therebetween, means including a temperature-sensing element and a visual-scale, manually-adjustable set point device disposed in said unit and connected between said first and second conductors for producing a D.C. error signal corresponding in polarity and magnitude to the sense and extent of the error between the desired temperature and the manually adjusted set point, a manually-adjustable calibration device disposed in said unit and coupled to said signal producing means for rendering said error signal accurate with respect to the scale reading of said adjusted set point device, a transistor amplifier disposed in said unit and having an input connected to receive said polarized error signal and an output circuit connected to supply a controlled D.C. current to said operator which varies in a sense and by an amount corresponding to the polarity and magnitude of said error signal, said amplifier having a manually adjustable range device for affording adjustments in the gain of the amplifier, and said amplifier having a manually adjustable zero setting device for adjusting the current produced by the amplifier when said error signal is zero, whereby all adjustments required for setting, calibrating and balancing the operation of the thermostatic unit and the power operator may be made at the location of the thermostatic unit.

References Cited by the Examiner

UNITED STATES PATENTS

| | | | |
|---|---|---|---|
| 2,813,235 | 11/1957 | Clay | 236—78 X |
| 2,954,530 | 9/1960 | Haskell. | |
| 3,050,257 | 8/1962 | Sweger et al. | 236—74 |
| 3,080,878 | 3/1963 | Dustin et al. | |
| 3,117,310 | 1/1964 | Roper et al. | |
| 3,164,755 | 1/1965 | Holt et al. | 236—78 |
| 3,168,242 | 2/1965 | Diener. | |
| 3,240,948 | 3/1966 | Burley. | |

FOREIGN PATENTS

| | | |
|---|---|---|
| 1,213,351 | 10/1959 | France. |

ALDEN D. STEWART, *Primary Examiner.*